UNITED STATES PATENT OFFICE.

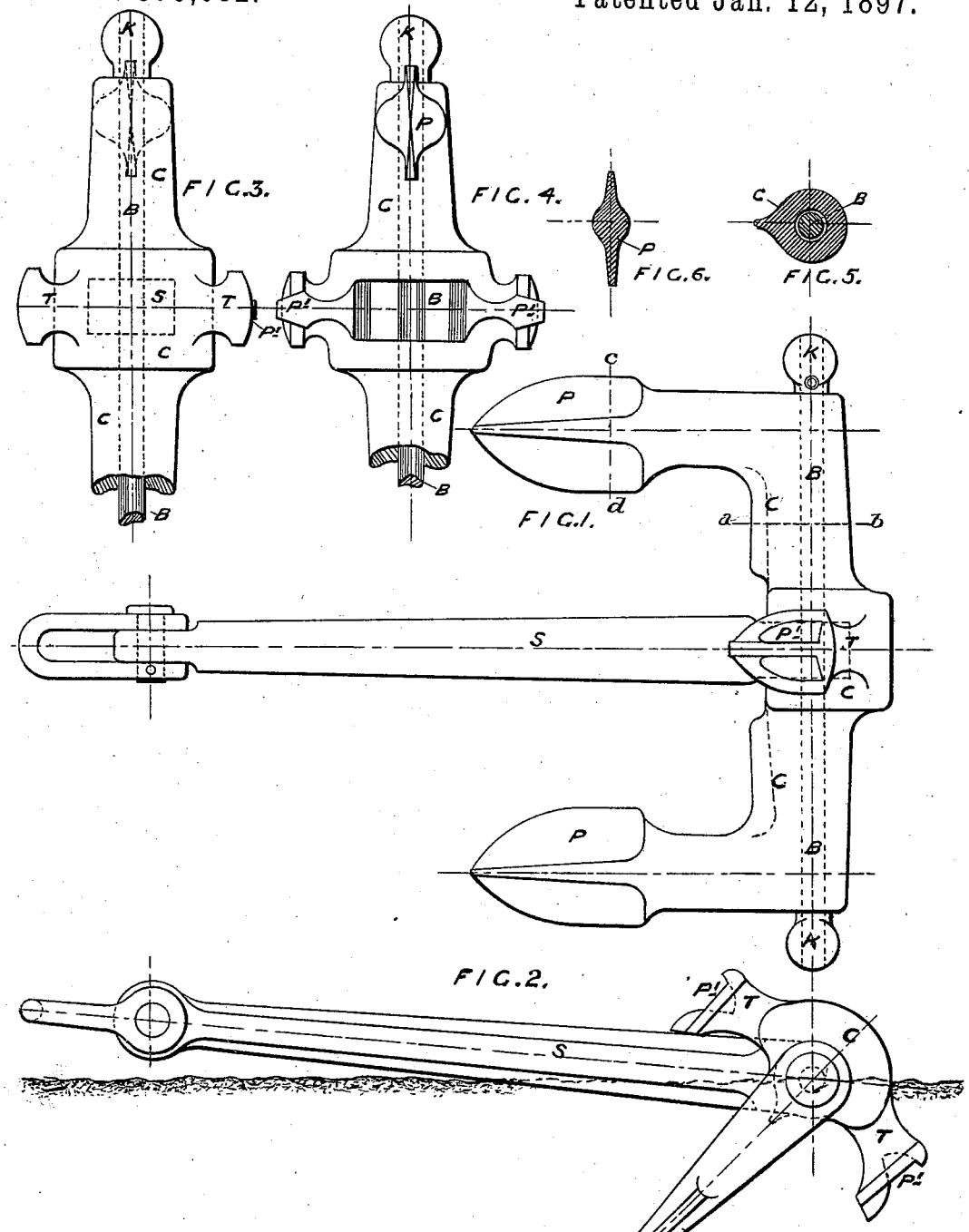

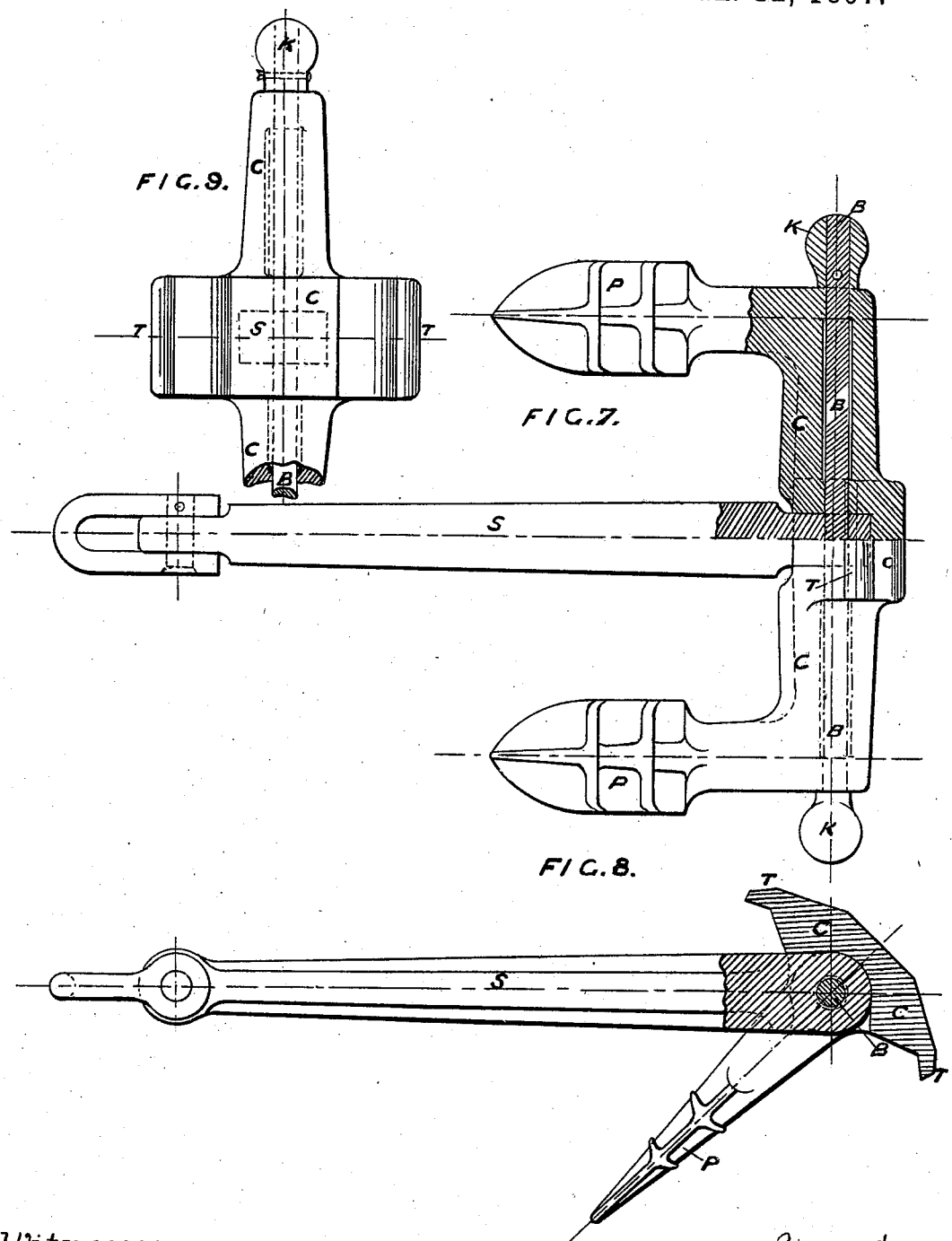

GEORGE TYZACK, OF SOUTH SHIELDS, ENGLAND.

ANCHOR.

SPECIFICATION forming part of Letters Patent No. 575,082, dated January 12, 1897.

Application filed June 1, 1896. Serial No. 593,871. (No model.) Patented in England March 7, 1893, No. 4,939.

*To all whom it may concern:*

Be it known that I, GEORGE TYZACK, a subject of the Queen of Great Britain and Ireland, and a resident of South Shields, in the county of Durham, England, have invented certain new and useful Improvements in Anchors, (for which I have obtained a patent for the United Kingdom, No. 4,939, bearing date March 7, 1893,) of which the following is a specification.

The objects of my invention are to simplify the construction, affording special facilities for being made of cast-steel, to insure the proper "tripping" and penetration into holding position of stockless anchors, and to increase the holding power, especially in soft ground.

Referring to the accompanying drawings, in which the same letters of reference designate the same parts in the several views, Figure 1 represents a plan of my improved anchor. Fig. 2 represents a side elevation of the same in the holding position. Fig. 3 is a rear view of the "crown-piece." Fig. 4 is a front view of the same. Fig. 5 is a sectional view of the crown-piece, taken on the line $a\,b$ of Fig. 1. Fig. 6 represents a cross-section through one of the "palms," taken on the line $c\,d$ of Fig. 1. Fig. 7 is a plan view, partly in section, of a slightly-modified form of anchor. Fig. 8 is a vertical longitudinal sectional view of the same. Fig. 9 is a rear view of the crown-piece used in the form shown in Figs. 7 and 8.

Referring to Sheet 1, Fig. 1 is a plan and Fig. 2 a side view of the anchor (shown in holding position) made according to my invention, the crown-piece C and the tripping-arms T (forming a "Trotman cross") being cast in one piece and being connected to the shank S by a "crown stock-bolt" B, which traverses the whole breadth of the crown-piece and may have upon its ends, projecting beyond the square shoulders, knobs K, which will act precisely in the manner of a "stock" upon the shank to prevent the anchor rolling when taking hold, Fig. 2 showing it when embedded in the ground, which it grips not only with the main palms P and the V-shaped front of the crown-piece, but with one of the hollow-backed palms P' of the tripping-arms T, forming the Trotman cross. The shank S is connected to the crown-piece C by the crown stock-bolt B, which passes through a hole cast through the crown-piece from shoulder to shoulder and through the eye of the shank, which bolt has, as shown, upon each end, projecting beyond the square shoulders, a rounded knob or ball K and acts precisely in the manner of the stock on the shank in the old form of anchors. One of the knobs may be formed integral with the bolt and the other knob secured thereon by a pin passing through the knob and bolt, as shown in Figs. 1, 7, and 9.

Fig. 3 is a back view of the crown-piece C, and Fig. 4 is a front view of same, intended to show the shape of the crown-piece C in relation to the tripping-arms T, the main palms P and auxiliary palms P', and the cavity to receive the eye of the shank S.

Fig. 5 is a section through $a\,b$ on Fig. 1 to show the V form of the front of the crown-piece, and Fig. 6 a section showing the shape of the palms P through $c\,d$, Fig. 1.

Referring to Sheet 2, Fig. 7 is a plan and Fig. 8 a side view, both partly in section, of an anchor of similar proportions, but in a modified form as to the tripping-arms.

Fig. 9 shows a back view of the crown-piece C. Here the tripping-arms, instead of forming also additional penetrating and holding arms, (in the manner of the Trotman cross on Sheet 1,) are short projections on the crown-piece for tripping the main palms P into penetrating and holding position. In this form of my invention the crown-piece C and the main palms are stopped at the proper angle by the angled shoulders in the cavity resting upon the neck of the shank instead of by the palms of the tripping-arms T, as on Sheet 1, resting upon the shank.

The anchor is shown accurately on both sheets of the proportions which would be adopted in an actual anchor of any size and such as I have adopted in practice and which I prefer, the points of the main palms P from the center of the crown-piece being about one-half the length of the shank S from the center of eye to center of shackle-bolt.

This improved anchor, in either of the forms shown, presents no difficulty in pattern-making, in molding, or in casting the crown-piece and the tripping and gripping arms in one case, or the tripping-arms in the other, and the square shoulders with or without the knobs or balls on the ends of the crown stock-bolt forming a stock through the crown-piece has been recognized by the highest authorities as a great improvement for vessels classed under Fig. I in *Lloyd's Register*. An anchor of the type shown becomes practically a "stocked anchor" with greatly-increased holding power.

In either form of the anchor I may give to the palms greater tenacity in holding in the ground by hollowing them each way from a center feather, or by transverse sunk grooves, or by raised ribs forming barbs, as shown in Figs. 7 and 8.

Having now described my invention, what I claim as new, and desire to secure by Letters Patent, is—

In an anchor the combination with a shank, of a crown-piece having a recess to receive the eye of the said shank, holding-arms at the ends of the said crown-piece, and tripping-arms having hollow backs at the center of the said crown-piece, a bolt having a knob on one end passing through the said crown-piece and the shank, a knob on the other end of the said bolt, and a pin passing through the knob and bolt to hold the knob in position, substantially as described.

GEORGE TYZACK.

Witnesses:
A. B. GOLDSBROUGH,
CHARLES WILSON.